United States Patent [19]

Beard

[11] 4,214,362
[45] Jul. 29, 1980

[54] GRIPPING MEANS

[75] Inventor: James H. Beard, Melton Mowbray, England

[73] Assignee: Production Engineering Research Association of Great Britain, Great Britain

[21] Appl. No.: 959,428

[22] Filed: Nov. 13, 1978

[30] Foreign Application Priority Data

Nov. 26, 1977 [GB] United Kingdom ............... 49310/77

[51] Int. Cl.² .............................................. B23P 19/02
[52] U.S. Cl. ........................................ 29/726; 29/252
[58] Field of Search ................. 29/726, 727, 252, 282, 29/427; 72/393

[56] References Cited

U.S. PATENT DOCUMENTS

| 3,387,353 | 6/1968 | Romero | 29/252 |
|---|---|---|---|
| 3,507,028 | 4/1970 | Stellatella | 29/252 |
| 3,835,520 | 9/1974 | Sismore | 29/427 |

*Primary Examiner*—Carl E. Hall
*Attorney, Agent, or Firm*—Charles E. Brown

[57] ABSTRACT

The invention relates to gripping means for use in the withdrawal of tubular members such as heat exchanger tubes from support means. The gripping means comprises an expandible collet arrangement adapted to be received within the tubular member, a main body portion having an end portion adapted to bear against the support means, a piston device slidably received in said body portion and defining at least one wall of an annular chamber within the body portion, a draw bar secured to the piston said draw bar having a head portion having a larger diameter than that of the draw bar, said draw bar passing concentrically through the body portion and the collet arrangement so that the head portion of the draw bar normally protrudes beyond said collet arrangement, the construction being such that on the introduction of pressurizing fluid into said annular chamber the draw bar is withdrawn into the body portion, the collet arrangement being forced to expand in diameter by the entry of the bar head portion, until the collet arrangement grips the internal surface of the tubular member, continued withdrawing movement of the draw bar and piston using the support means as a reaction surface causing the tubular member to be withdrawn from the support means.

10 Claims, 1 Drawing Figure

U.S. Patent
Jul. 29, 1980
4,214,362
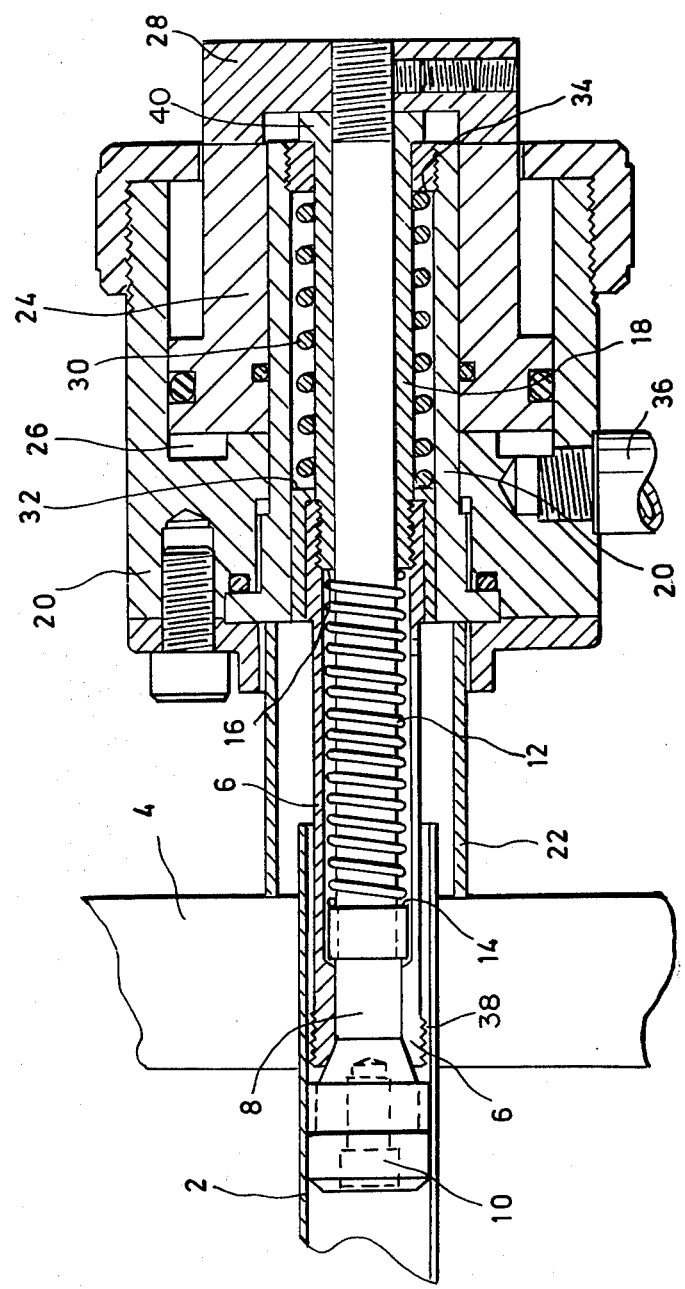

GRIPPING MEANS

BACKGROUND OF THE INVENTION

The present invention relates to gripping means for use in the withdrawal of tubular members from support means.

In an example of use of the means of the present invention, to which it is in no way limited, a multiplicity of tubular members is received in a plurality of support walls comprising a heat exchanger, evaporator or condenser. After a period of service the tubular members require replacement and a method of replacing them is described in our co-pending application Ser. No. 870,212 now U.S. Pat. No. 4,161,810.

In a typical example, a hollow adapter is fixed to a leading edge of the tubular member to be replaced and a gripping device is applied to the adapter to pull it and the tubular member out from the support walls using a stepwise action. This pulling action is enhanced if the preliminary stage is carried out whilst a trailing edge of the tubular member is firmly held in the rear support wall so that pulling the tubular member is drawn in a manner to reduce its diameter and break any corrosion bonds between it and the intermediate walls.

However, it not infrequently occurs that the trailing edge of the tubular member is so firmly fixed in the rear support wall that it is extremely difficult to free it in the manner described. It is therefore necessary on occasions to apply a pulling action in an opposite direction to free the member.

BRIEF DESCRIPTION OF THE INVENTION

The present invention therefore provides a gripping means for gripping tubular members to be removed from a support means, comprising an expandible collet arrangement adapted to be received within the tubular member, a main body portion having an end portion adapted to bear against the support means, a piston device slidably received in said body portion, an annular chamber within the body portion defined at least by one wall of the piston device, a draw bar secured to the piston said draw bar having a head portion having a larger diameter than that of the draw bar, said draw bar passing concentrically through the body portion and the collet arrangement so that the head portion of the draw bar normally protrudes beyond said collet arrangement, the construction being such that on the introduction of pressurising fluid into said annular chamber the draw bar is withdrawn into the body portion, the collet arrangement being forced to expand in diameter by the entry of the bar head portion, until the collet arrangement grips the internal surface of the tubular member, continued withdrawing movement of the draw bar and piston using the support means as a reaction surface causing the tubular member to be withdrawn from the support means.

Particular advantage is gained from the provision of an annular chamber, since the maximum power is transmitted to the wall of the piston device at the region of its abutment with the inner wall of the body portion along which it is forced to slide. Moreover, the annular arrangement permits the various parts of the device to be arranged concentrically in a compact manner which lends stability and robustness not present in other tube pulling apparatus using a piston and cylinder arrangement with a conventional pressure chamber.

Advantageously, the collet arrangement has a roughened surface where it is intended to be in contact with the internal surface of the tubular member.

Conveniently, the end portion of the main body portion comprises a replacable tubular portion which in use is arranged substantially concentrically with the end of the tubular member to be gripped.

BRIEF DESCRIPTION OF THE DRAWING

An example of a gripping means according to the invention will now be described in detail. It will be understood that the description, which is intended to be read with reference to the accompanying drawing, is given by way of example only and not by way of limitation.

The drawing shows a cross-sectional view through the gripping means.

DETAILED DESCRIPTION OF THE DRAWING

A tubular member 2 which in the present example is a tube in a heat exchanger is fixed by a corrosion bond in the exchanger support wall 4.

The gripping means comprises a collet arrangement 6 through which passes a draw-bar 8 having an enlarged head portion 10 protruding beyond the collet 6. A compression spring 12 bears against a shoulder 14 on the draw-bar 8 and against a shoulder 16 of a tubular extension piece 18 of the collet 6.

The extension piece 18 is received within a main body portion 20 which is provided with a tubular end portion 22 which bears against the support wall 4, using it as a reaction surface.

A piston device 24 is slidably received in the body portion 20 to form a chamber 26, and the right hand end of the draw bar (as viewed in the drawing) is externally screw threaded so as to secure the piston 24 to an end cap 28. A compression spring 30 bears against a shoulder 32 provided on the extension piece 18 and an annular lip 34 on the main body portion 20.

In use, the draw bar head portion 10 and the collet 6 are placed within the trailing end of the tubular member 2, so that the end portion 22 of the body 20 contacts the wall 4. Pressurising fluid is supplied to the chamber 26 through an inlet 36 and the piston 24 commences to move to the right. The draw bar also moves to the right, compressing the spring 12. The spring 30 maintains the collet 6 in position so that the enlarged head portion 10 of the draw bar forces the collet 6 to expand so that roughened surfaces 38 thereof firmly grip the internal surface of the tubular member 2. The extension piece 18 has a rear flange 40 disposed within the end cap 28 and engaging the rear of the annular lip 34 to limit the forward movement of the collet 6.

At this point the collet begins to move to the right under the influence of the piston and against the spring 30. Thus the tubular member 2 is forced to leave the support wall. On release of the pressure in the chamber 26, the parts return to their normal position under the influence of compression springs 12 and 30.

Various modifications may be made within the scope of the invention as defined in the following claims.

We claim:

1. A gripping mechanism for removing tubular members extending through a support wall by drawing the tubular members through the support wall, said gripping mechanism comprising a main body portion, said main body portion having front and rear ends, a central bore extending entirely through said main body portion, a collet arrangement projecting from said main body portion and having an expandable front portion for positioning in a tubular member to be withdrawn, said collet arrangement being tubular and including a rear portion slidably guided in said central bore for movement through said main body portion, an annular chamber in at least a rear part of said main body portion surrounding said central bore, an annular piston device telescoped within said annular chamber and having front and rear ends, a draw bar extending entirely through said collet arrangement and having a front end in the form of an enlarged head portion cooperative with said collet arrangement front portion upon relative rearward movement of said draw bar, coupling means coupling a rear portion of said draw bar to said piston device for effecting rearward movement of said draw bar through said collet arrangement and said main body portion in response to rearward movement of said piston device, said main body portion having a tubular front end portion defining reaction means for reaction engagement with a support wall in telescoped relation to a tubular member to be drawn through said support wall, said piston device front end setting off a front part of said annular chamber, and means for introducing a fluid under pressure into said annular chamber front part for reacting on said piston device for effecting rearward movement of said piston device together with an initial rearward movement of said draw bar relative to said collet arrangement to extend said collet arrangement front portion into gripping engagement with a tubular body and subsequent rearward movement in unison of said draw bar and said collet arrangement.

2. A gripping mechanism as claimed in claim 1 wherein there are return means for said collet arrangement in the form of a compression spring encircling said collet arrangement rear portion and reacting on a rear part of said main body portion.

3. A gripping mechanism as claimed in claim 1 wherein there are return means for said draw bar in the form of a compression spring encircling a front part of said draw bar within said collet arrangement and reacting on said collet arrangement to urge separation of said draw bar and said collet arrangement.

4. A gripping mechanism as claimed in claim 3 wherein there are return means for said collet arrangement in the form of a compression spring encircling said collet arrangement rear portion and reacting on a rear part of said main body portion, said compression spring being axially offset.

5. A gripping mechanism according to claim 4 wherein a rear part of said draw bar is guided in a rear part of said collet arrangement.

6. A gripping mechanism according to claim 1 wherein said coupling means includes a cup shaped member disposed rearwardly of said main body portion and having an annular outer part engaging the rear end of said piston device, said draw bar being secured to a central part of said cup shaped member.

7. A gripping mechanism according to claim 6 wherein said collet arrangement has a flange at the rear end thereof disposed between said cup shaped member and the rear end of said main body portion to limit forward movement of said collet arrangement relative to said main body portion.

8. A gripping mechanism as claimed in claim 1 wherein the tubular front end portion of the main body portion comprises a replacable tubular portion which in use is arranged substantially concentrically with the end of the tubular member to be gripped.

9. A gripping mechanism as claimed in claim 1, wherein the head portion of the draw bar has a part-conical neck portion adapted to co-operate with the collet arrangement front portion to force the latter to expand in diameter.

10. A gripping mechanism as claimed in claim 1, wherein compression spring means are provided which when pressure is released in said annular chamber front part act to return the draw bar to its protruding condition and to reduce the size of the annular chamber front part.

* * * * *